Sept. 19, 1944.  J. N. GOOD  2,358,634
RELEASE VALVE DEVICE
Filed April 23, 1942   2 Sheets-Sheet 1
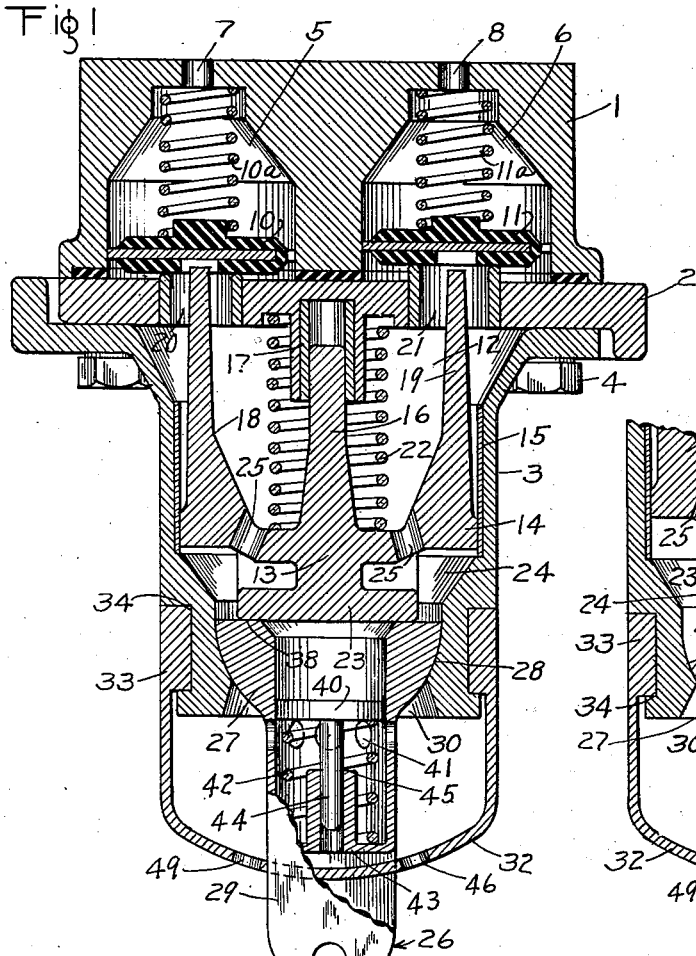
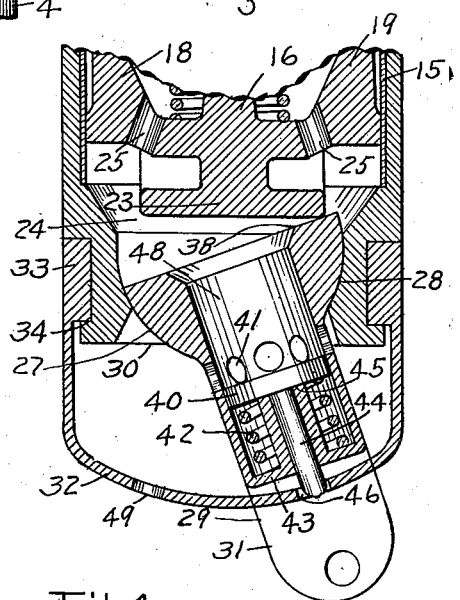
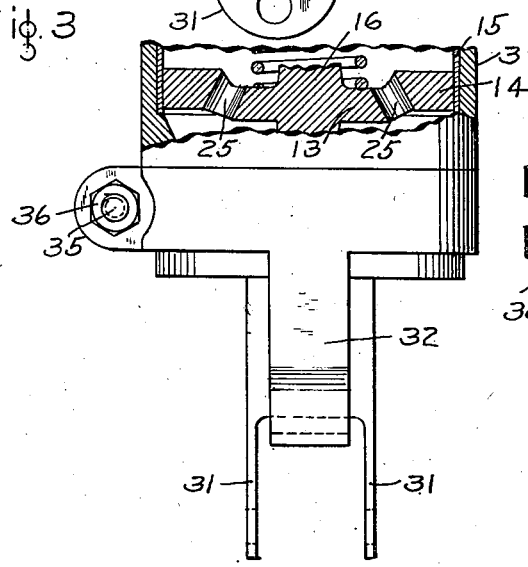
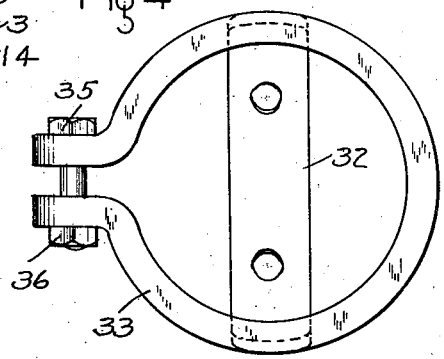
INVENTOR
JOHN N. GOOD
BY
ATTORNEY Sept. 19, 1944.  J. N. GOOD  2,358,634
RELEASE VALVE DEVICE
Filed April 23, 1942   2 Sheets-Sheet 2
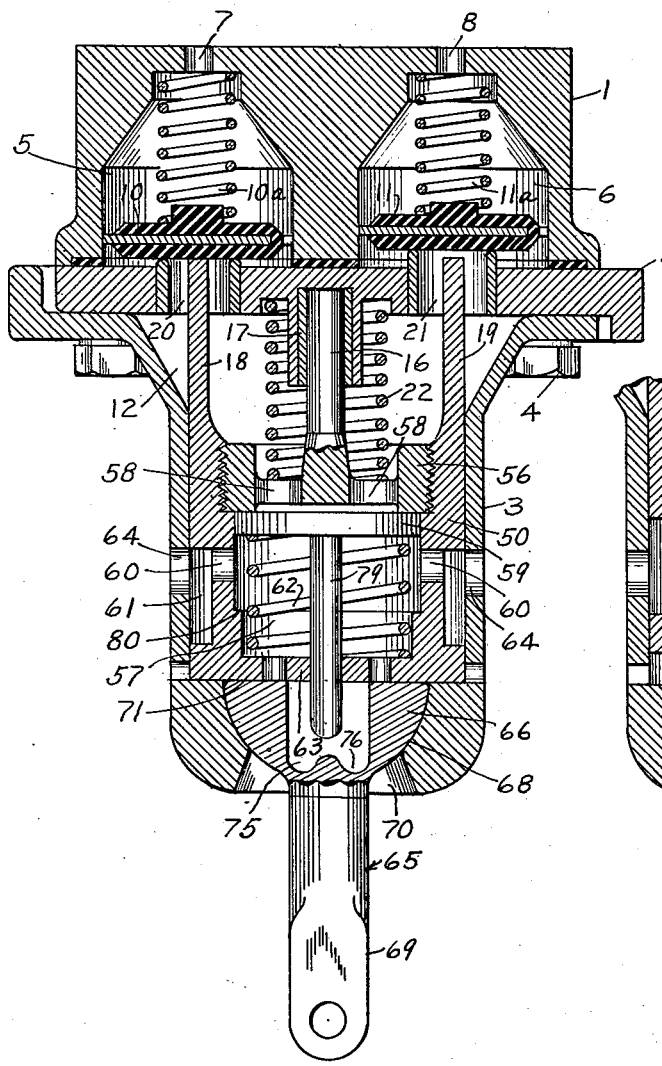
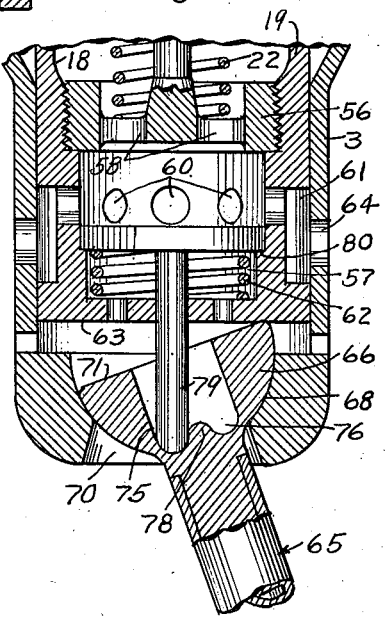
INVENTOR
JOHN N. GOOD
BY
ATTORNEY Patented Sept. 19, 1944

2,358,634

UNITED STATES PATENT OFFICE 2,358,634

RELEASE VALVE DEVICE

John N. Good, Wilmerding, Pa., assignor to The Westinghouse Air Brake Company, Wilmerding, Pa., a corporation of Pennsylvania Application April 23, 1942, Serial No. 440,135

10 Claims. (Cl. 303—80)

This invention relates to release valve devices, and more particularly to reservoir release or discharge valve devices for use in fluid pressure brake apparatus.

It is customary to provide a reservoir release or discharge valve device on a vehicle equipped with a fluid pressure brake, in order to permit venting of fluid under pressure from one or more of the storage reservoirs when desired.

The reservoir release or discharge valve device, now employed on vehicles equipped with the well known "AB" valve, is manually operative from the side of the vehicle to release fluid under pressure first from the auxiliary reservoir and then from both the auxiliary and emergency reservoirs. With this type of reservoir release valve device, it is necessary, when the reservoirs are to be discharged of fluid under pressure, for the operator to hold the valve in its open position during the entire discharge period, thus much time and labor is expended in discharging the fluid pressure in the reservoirs on a train of cars.

The principal object of the invention is to provide a manually operative reservoir release valve device whereby the pressure in the auxiliary and emergency reservoirs may be released when desired and wherein the device will be automatically maintained in open position during the pressure release period.

It is another object of the invention to provide a reservoir release valve device of the type set forth which may be opened manually so as to discharge fluid under pressure from one or more reservoirs, and which will be held open by the pressure of the fluid being discharged until such time as the reservoir pressure has been reduced to substantially atmospheric pressure and will then be automatically operated to its closed position.

Another object of the invention is to provide a reservoir release valve device, which, by a simple manual operation, may be opened and automatically locked in open position to discharge fluid under pressure from the reservoir, and which will be automatically unlocked and closed when the reservoir pressure has been reduced to a predetermined low degree.

Other objects and advantages will be apparent from the following more detailed description of the invention.

In the accompanying drawings,

Fig. 1 is a vertical sectional view of a reservoir release or discharge valve device embodying one form of my invention, the device being shown in its closed position.

Fig. 2 is a fragmentary sectional view of the release valve device shown in Fig. 1, the device being shown in the release or open position.

Fig. 3 is a fragmentary elevational view, partly in section, of the release valve device shown in Fig. 1.

Fig. 4 is a plan view of an adjustable guide bar shown in Fig. 3.

Fig. 5 is a vertical sectional view of a release valve device embodying another form of the invention and illustrated in its closed or normal position.

Fig. 6 is a fragmentary sectional view of the release valve device shown in Fig. 5, the device being shown in release or open position.

*Description of the embodiment shown in Figs. 1 to 4, inclusive*

As shown in Figs. 1 to 4, inclusive, of the drawings, the reservoir release valve device is of the type disclosed in the United States Patent No. 2,012,718, issued to Ellis E. Hewitt, on August 27, 1935, and may be described briefly as comprising a casing section 1 which may be rigidly secured to the casing of the usual brake controlling valve device, not shown. This device also comprises a valve seat section 2 which is mounted on the casing section 1, and a body section 3 which is secured to the seat section 2. Suitable means such as bolts 4 may be provided for clamping the casing sections together.

Formed in the casing section 1 are valve chambers 5 and 6, which are connected to the usual storage reservoirs, such as auxiliary and emergency reservoirs, by way of passages 7 and 8, respectively. Spring seated release valves 10 and 11 are disposed in the respective chambers 5 and 6 and are adapted normally to engage suitable seat ribs formed on the valve seat section 2 as shown in Fig. 1 of the drawings.

The body section 3 has formed therein a chamber 12 containing a cross-head 13. The cross-head 13 is provided with a guide portion 14 which is slidably mounted in a wear resisting bushing 15 which lines a portion of the chamber 12 and which has a press fit with the body section 3 of the casing. The cross-head is also provided with a central upwardly extending guide portion 16 which projects into a suitable bore formed in a portion of the valve seat section 2 and which is slidably guided in a suitable wear resisting bushing 17 having a press fit with the casing. Projecting upwardly from the cross-head are two laterally spaced fingers, 18 and 19, which extend through openings 20 and 21, formed in the valve seat section 2, into operative alignment with the valves 10 and 11, respectively. A spring 22 is interposed between the cross-head 13 and the valve seat section 2 for urging the cross-head downwardly to the position shown in Fig. 1 of the drawings. Projecting centrally from the opposite side of the cross-head 13 is a circular member 23 which is contained in a chamber 24 formed in the body section 3, which chamber is in constant open communication with the chamber 12 by means of passages 25 in the cross-head.

For controlling the operation of the cross-head 13 there is provided a rockable control member 26 comprising, at one end, an enlarged portion 27 having an outer bearing surface 28 which is in the form of a portion of a sphere and which slidably engages the wall of an accommodating recess provided in the body section 3.

The member 26 also comprises an actuating arm 29 which extends to the exterior of the body section through a relatively large central circular opening 30 provided in the body section, the length of the arm being such that the outer end thereof will be spaced from the body section of the casing.

The outer end portion of the arm 29 is provided with spaced guide flanges 31 between which extends a U-shaped guide bar 32.

This guide bar is carried by a split ring 33 which is mounted in an annular groove 34 provided on the exterior of the lower portion of the body section of the casing. The ends of the ring 33 are provided with flanges which are arranged to be drawn together by means of a bolt 35 and a nut 36 for contracting the ring so as to clamp the ring against rotary motion relative to the body section of the casing.

As shown in the drawings the member 26 is so guided that it is only movable in a straight line to the left and to the right of the vertical center line of the body section. However, if for any reason it is desired to move the handle at an angle to such movement, the ring and thereby the guide bar is rotated relative to the body section until the bar is in the position to provide the desired directional movement of the member 26. To accomplish such adjustment, the nut 36 is slacked back so as to permit the ring to expand sufficiently to provide for the adjusting movement of the ring. With the bar properly positioned the nut is rotated to effect the contraction of the ring, thus the ring is again rigidly secured to the body section. It will here be noted that the guide bar as it is rotated acts to rotate the member 26 about its axis, thus the proper cooperative relationship between the guide bar and the member is maintained at all times.

The enlarged portion 27 of the member 26 is provided with a flat horizontally disposed surface 38 upon which rests the circular member 23 of the cross-head 13. When the member 26 is rocked from its central or normal position the end portion thereof, acting on the portion 23 causes the cross-head to move upwardly against the opposing pressure of spring 22. The cross-head 13, in its upward movement, acts through the medium of finger 18, to unseat valve 10, so as to vent fluid under pressure from the auxiliary reservoir, and then acts through the medium of finger 19, to unseat the valve 11 so as to vent fluid under pressure from the emergency reservoir. The valve 10 will, of course, be maintained unseated while the valve 11 is held unseated, thus fluid under pressure is vented from both reservoirs at the same time.

If the member 26 is moved to the position in which it is shown in Fig. 2 of the drawings, both valves 10 and 11 will be unseated. However if the member is stopped short of this position, only the valve 10 will be unseated so that only the auxiliary reservoir will be vented.

The member 26 is hollow for the greater portion of its length there being an axial bore 48 in the member which is open to the upper surface 38. Slidably mounted in the bore for either upward or downward movement longitudinally of the member is a piston 40 which, with the member 26 in its normal position, will be maintained above a series of fluid pressure discharge openings 41, leading from the bore to the atmosphere, by the action of a spring 42 which is interposed between the underside of the piston and a wall 43 of the member 26. The piston is provided with a locking rod 44 which moves with the piston and which is slidable in an annular combined guide rib and piston stop 45, formed integral with the wall 43, the inner end of this rib terminating short of the atmospheric openings 41 a sufficient distance to permit the piston to move far enough to clear the openings 41 as shown in Fig. 2.

With the member 26 in the position in which it is shown in Fig. 2 the locking rod 44 is in axial alignment with an opening 46 provided in the guide bar 32 so that when, as will now be described, the piston is moved downwardly, the locking rod will be projected into the opening 46 and in this position will lock the member against movement toward its normal position.

Assuming the member 26 to be in its normal position and it is desired to completely deplete both reservoirs of fluid under pressure, the member 26 is moved to the position in which it is shown in Fig. 2. With the member 26 in this position the valves 10 and 11 will be maintained unseated as hereinbefore described. Fluid under pressure flows past these valves to the chamber 12 from whence it flows through the passages 25 in the cross-head to the chamber 24 and to the bore 48. Fluid under pressure in bore 48 acting on piston 40 causes the piston and thereby the lock rod 44 to move downwardly against the opposing pressure of spring 42. The piston in its traverse uncovers the openings 41 to the bore 48 and consequently to the chamber 24 and is then brought to a stop by engagement with the stop 45, so that fluid under pressure from this chamber and consequently from the auxiliary and emergency reservoir now flows through the openings 41 to the atmosphere. The piston 40 in its traverse to this position causes the lock rod 44 to be moved into the opening 46 in the guide bar 32, thereby locking the member 26 in this position.

Now when the reservoirs and chamber 24 are substantially completely depleted of fluid under pressure the spring 36 acts to return the piston 40 and thereby the locking rod 44 to their normal position, thus unlocking the member 26. With the member 26 unlocked, the spring 22 acts to return the cross-head 13 and member 26 to their normal positions, which permits the spring 10a to seat the release valve 10 and spring 11a to seat the release valve 11.

As hereinbefore mentioned the release valve 10 is unseated upon a certain movement of the member 26 either to the right or the left of the normal or control position and upon further movement of said member in the same direction the release valve 11 is also unseated, so that the trainman can either vent fluid under pressure from only the auxiliary reservoir or from both of the reservoirs at the same time. It will thus be understood that if the member 26 is moved to the left of its central position a distance sufficient to unseat the valves 11 and 12 the rod 44 will be projected into an opening 49 provided in the guide bar 32 in the manner described in connection with movement of the member 26 to the right of its central or normal position.

It will thus be evident that after the operator has imparted the opening movement to the valves 10 and 11 by tilting the member 26 a certain distance in either direction from its central or normal position, he is free to let go of said member and proceed to the next car, the subsequent functions of returning the valve mechanism to its normal position being carried out automatically.

If, at any time, it should be necessary or desirable to release all or some of the pressure from the auxiliary reservoir only, the locking of the discharge valve in its discharge position is not desirable. Under these circumstances the member 26 is moved either to the right or to the left of its central position, shown in Fig. 1, a distance sufficient to unseat the valve 10, but not far enough to unseat the valve 11. With the valve 10 unseated fluid under pressure flows to the bore 48 in the manner herein before described in connection with venting of fluid under pressure from both reservoirs. Fluid under pressure in bore 48 acting on piston 40 causes the piston and thereby the lock rod 44 to move downwardly against the opposing pressure of spring 42 until it is brought to a stop by the end of the lock rod engaging the guide bar 32. The piston in its traverse uncovers a portion of the openings 41 to the bore 48 and consequently to chamber 24 so that fluid under pressure from this chamber and consequently from auxiliary reservoir now flows therethrough to the atmosphere. It will be noted, however, that since there is no opening in the guide bar through which the lock rod 44 may project with the member 26 thus positioned, this member must be manually maintained in this position.

When the desired reduction in pressure is effected in the auxiliary reservoir, the operator lets go of the member 26. The pressure of spring 22 then returns the cross-head 13 and member 26 to their normal position against the opposing frictional resistance due to the engagement of the rod 44 with the guide bar 32. As the cross-head is thus moved, the spring 10a acts to seat the valve 10.

*Description of embodiment shown in Figs. 5 and 6*

In Fig. 5 there is shown a reservoir release valve device embodying another form of the invention, and since both embodiments are similar in many respects, corresponding parts of the two embodiments will be designated by the same reference numerals.

In this embodiment of the invention the guide bar 32 employed in the first embodiment is omitted and the piston and lock rod is mounted in the cross-head instead of within the operating member.

In the present embodiment a cross-head 50 is slidably mounted in chamber 12 of the body section 3. This cross-head is provided with the central guide portion 16 which is carried by an annular member 56 having screw-threaded engagement with the cross-head 50 intermediate the upwardly projecting valve operating fingers 18 and 19. The release spring 22 for urging the cross-head downwardly to the position shown in Fig. 5 of the drawings is interposed between the annular member 56 and the valve seat section 2.

Below the annular member 56 the cross-head is also provided with an axial bore 57 which is open at its upper end to the chamber 12 by way of passages 58 provided in the member 56. Slidably mounted in the bore 57 for either upward or downward movement longitudinally of the cross-head is a piston 59 which is normally maintained above a series of discharge openings 60, leading from the bore to a recess 61 formed in the cross-head, by the action of a spring 62 which is interposed between the underside of the piston and a wall 63 forming the lower end of the cross-head.

The recess 61 is of such vertical length that it will be maintained in constant open communication with the atmosphere, irrespective of the position of the cross-head, by way of a series of radially arranged discharge openings 64 formed in the wall of the body section 3.

For controlling the operation of the cross-head 50 there is provided a rockable control member 65 comprising at one end an enlarged portion 66 having an outer bearing surface 68 which is in the form of a portion of a sphere and which slidably engages the wall of an accommodating recess provided in the body section 3 in identically the same manner as the enlarged portion 27 in the embodiment, illustrated in Figs. 1 to 4, inclusive.

The member 65 also comprises an actuating arm 69 which extends to the exterior of the body section through a relatively large central circular opening 70 provided in the body section, the length of the arm being such that the outer end thereof will be spaced from the body section.

The enlarged portion 66 of the member is provided with a flat horizontally disposed surface 71 upon which rests the wall 63 of the cross-head 50. This enlarged portion is also provided with a central bore 75 which is open to the upper surface 71 and which at its closed end is provided with an annular notch 76 which surrounds a central projection 78.

The piston 59 is provided with a locking bar 79 which extends through the wall 63 of the cross-head 50 into the bore 75 of the enlarged portion 66 of the member 65 for holding the member 65 against movement toward its normal position, as will presently be described.

When it is desired to deplete both reservoirs of fluid under pressure, the member 65 is moved either to the right or to the left of its normal position shown in Fig. 5. With the member moved in a direction toward the right-hand as viewed in Fig. 6, the valves 10 and 11 will be maintained unseated in identically the same manner as hereinbefore described. Fluid under pressure flows past these unseated valves to the chamber 12 from whence it flows through the passages 58 to the bore 57. Fluid under pressure in bore 57 acting on piston 59 causes the piston and thereby the lock rod or bar 79 to move downwardly against the opposing pressure of spring 62. The piston in its traverse uncovers the openings 60 leading to the bore 57 and consequently to chamber 12 and is then brought to a stop by engagement with a shoulder 80 formed in the bore 57 of the cross-head 50, so that fluid under pressure from this chamber and consequently from the reservoir now flows to the atmosphere, by way of openings 60, cavity 61, and openings 64. As the piston 59 moves to this position the lock rod projects into the notch 76 and holds the member 65 in this position.

Now when the reservoirs and chamber 12 are substantially completely depleted of fluid under pressure the spring 62 acts to return the piston 59 and thereby the lock rod 79 to its normal or unlocking position. When this occurs the pressure of the spring 22 returns the cross-head 50 and member 65 to their normal position, which permits the springs 10a and 11a to seat the valves 10 and 11, respectively.

It will be understood that if the member 65 is moved in a direction toward the left-hand from its central position to unseat both valves 10 and 11, instead of to the right as just described the lock rod 79 will be projected into the notch 76 and thereby lock the member 65 in this position in the same manner as when the member is moved in the other direction.

It will also be understood that if, at any time, it should be desired to release either all or some of the pressure from the auxiliary reservoir only, the member 65 will be moved only a distance sufficient to unseat valve 10 and that under these conditions the lock rod 79 will not lock the member against movement toward its normal position just as described in connection with the first embodiment. It should here be mentioned that when the member is moved far enough to unseat the valve 10 only the rod 79 will not be permitted to move into the notch 76, so that when the member is released it will, under the influence of the compressed spring 22, automatically return the member to its normal position.

In this embodiment of the invention there is no guide bar employed for determining the direction of travel of the member 69 but it is apparent that if desired the guide member shown in Figs. 1 to 5, inclusive, may be clamped to the casing section 3.

Having now described my invention, what I claim as new and desire to secure by Letters Patent, is:

1. In a fluid pressure release valve device of the type comprising a casing having two valve chambers and a fluid pressure discharge passage leading from each of said chambers, a valve disposed in each of said chambers for normally closing communication through which fluid under pressure in said chambers may flow to said passages, and means slidably mounted in said casing for successively unseating the valves, in combination, manually operated means for actuating the valve unseating means, said manually operated means having one position for effecting operation of said valve unseating means to unseat one of said valves and another position for effecting operation of the valve unseating means to unseat both of said valves, a lock member secured to the casing a fluid pressure conducting communication leading from said passages to the atmosphere, a valve piston normally closing said communication and operative upon the supply of fluid under pressure to said communication for opening said communication to the atmosphere, and a rod carried by said valve piston for engaging said lock member for holding said manually operated means only in said other position until the pressure of fluid in said communication has been substantially reduced to atmospheric pressure.

2. In a fluid pressure release valve device, in combination, a casing having a fluid pressure discharge communication therethrough, valve means mounted in said casing normally closing said communication and operative to open said communication, manually operated means capable of universal movement for operating said valve means, guide means carried by said casing and cooperating with said manually operated means for maintaining the manually operated means in a predetermined path of travel as it is operated, said guide means being adjustable to accommodate movement of the manually operated means in a different path of travel, and means responsive to the pressure of fluid being discharged through said discharge communication to engage said guide means and hold said manually operated means temporarily in its valve unseating position.

3. In a fluid pressure release valve device, in combination, a casing having a fluid pressure discharge communication therethrough, valve means mounted in said casing normally closing said communication and operative to open said communication, manually operated means capable of universel movement for operating said valve means, said manually operated means having at one end a ball and socket connection with said casing and a substantially horizontal surface in operative engagement with said valve means and having at the opposite end a pair of spaced jaws, guide means carried by said casing comprising a guide bar extending through said spaced jaws for maintaining the handle in a predetermined path of travel as it is operated, said guide means being adjustable to accommodate movement of the handle in a different path of travel, and means carried by said manually operated means responsive to the pressure of fluid being discharged through said discharge communication to engage said guide means and hold said manually operated means in its valve unseating position so long as the pressure of fluid in said communication is above a predetermined degree.

4. In a fluid pressure release valve device, in combination, a casing having a fluid pressure discharge communication therethrough, valve means mounted in said casing normally closing said communication and operative to open said communication, manually operated means capable of universal movement for operating said valve means, and guide means carried by said casing and cooperating with said manually operated means for maintaining the manually operated means in a predetermined path of travel as it is operated, said guide means being adjustable to accommodate movement of the manually operated means in a different path of travel, and comprising a ring contractable to secure the guide means rigidly in position on the casing and expandable to provide for movement of the guide means relative to the casing.

5. In a fluid pressure release valve device, in combination, a casing having a fluid pressure discharge communication therethrough, valve means mounted in said casing normally closing said communication and operative to open said communication, manually operated means capable of universal movement for operating said valve means, guide means carried by said casing and cooperating with said manually operated means for maintaining the manually operated means in a predetermined path of travel as it is operated, said guide means being adjustable to accommodate movement of the manually operated means in a different path of travel, and means carried by said manually operated means and arranged for cooperation with said guide means for maintaining said manually operated means and thereby said valve means in a position to open said communication.

6. In a fluid pressure release valve device, in combination, a casing having a fluid pressure discharge communication therethrough, a valve mounted in said casing normally closing said communication, means slidably mounted in said casing for unseating said valve, manually operated means capable of universal movement for operating said means, adjustable guide means carried by the casing and cooperating with said manually operated means for maintaining the manually operated means in a selected predetermined path of travel as it is operated, and means carried by the manually operated means automatically operative to engage said adjustable guide means for maintaining said valve means unseated when said manually operated means is moved to a position to effect operation of said means to unseat said valve.

7. In a fluid pressure release valve device, in combination, a casing having a fluid pressure discharge communication therethrough, a valve mounted in said casing normally closing said communication, a hollow manually operated means capable of universal movement for unseating said valve, said hollow manually operable means defining a portion of said discharge communication, an adjustable guide member carried by said casing and cooperating with said manually operated means for maintaining the manually operated means in a selected predetermined path of travel as it is operated, and a piston and piston rod slidably mounted in said hollow manually operated means, said piston rod being movable by said piston, when the piston is subjected to the pressure of fluid, into engagement with said adjustable guide member to lock said manually operated means in a position to maintain said valve unseated.

8. In a fluid pressure release valve device, in combination, a casing having a fluid pressure discharge communication therethrough, a valve mounted in said casing normally closing said communication, means slidably mounted in said casing for unseating said valve, manually operated means capable of universal movement for effecting operation of said means to unseat said valve, an adjustable guide member carried by said casing and cooperating with said manually operated means in a selected predetermined path of travel as it is operated, and mechanism comprising piston means slidably mounted in said first mentioned means and responsive to the pressure of fluid being discharged through said discharge communication to engage and hold said manually operated means in its valve unseating position.

9. In a fluid pressure release valve device of the type comprising a casing having two valve chambers and a fluid pressure discharge passage leading from each of said chambers, a valve disposed in each of said chambers for normally closing communication through which fluid under pressure in said chamber may flow to said passages, and means slidably mounted in said casing for successively unseating said valves, in combination, a manually operated member for operating said valve unseating means, said member having a bore open to said passages and a plurality of laterally spaced openings leading from said bore to the atmosphere, a piston valve mounted in said bore, normally closing communication from said bore through said openings and operative upon the supply of fluid under pressure to said bore for opening said bore to the atmosphere, and means carried by said piston valve and operative when said bore is open to the atmosphere to lock said manually operated means and thereby said first mentioned means in its valve unseating position so long as the pressure of fluid in said bore is above a predetermined degree.

10. In a fluid pressure release valve device of the type comprising a casing having two valve chambers and a fluid pressure discharge passage leading from each of said chambers, a valve disposed in each of said chambers for normally closing communication through which fluid under pressure in said chamber may flow to said passages, in combination, means slidably mounted in said casing for successively unseating said valve, said means having a bore open to said passages and a plurality of laterally spaced openings leading from said bore to the atmosphere, an operating handle for operating said means to unseat said valves, a piston valve mounted in said bore, normally closing communication from said bore through said openings and operative upon the supply of fluid under pressure to said bore for opening said bore to the atmosphere, and a rod carried by said piston valve operative when said piston valve is in a position to open said bore to the atmosphere for engaging and holding said manually operated means and thereby said first mentioned means in its valve unseating position until the pressure of fluid in said bore is reduced to substantially atmospheric pressure.

JOHN N. GOOD.